United States Patent
Musiol et al.

[11] Patent Number: 5,326,132
[45] Date of Patent: Jul. 5, 1994

[54] REACTION CAN FOR AIR BAG SYSTEM

[76] Inventors: John A. Musiol, 1611-C Cass Lake Rd., Keego Harbor, Mich. 48320; Carl L. Flair, 2853 Lenox, Troy, Mich. 48098; Douglas E. Medvedik, 332 Woodside Ct., Apt. 110, Rochester Hills, Mich. 48307; Robert P. Fontecchio, 658 Timberline, Rochester Hills, Mich. 48309

[21] Appl. No.: 934,971

[22] Filed: Aug. 25, 1992

[51] Int. Cl.⁵ .............................. B60R 21/16
[52] U.S. Cl. .................... 280/732; 280/728 R; 220/642; 220/647
[58] Field of Search ........... 280/728 A, 728 B, 728 R, 280/730 R, 731, 732, 736, 743 R; 220/640, 642, 643, 646, 647, 401

[56] References Cited
U.S. PATENT DOCUMENTS

| Re. 33,397 | 10/1990 | Anders | 220/647 |
| 4,040,461 | 8/1977 | Carson | 220/401 |
| 5,069,480 | 12/1991 | Good | 280/728 |
| 5,085,463 | 2/1992 | Kreuzer | 280/728 |

FOREIGN PATENT DOCUMENTS

| 0386782 | 4/1908 | France | 220/640 |
| 0155855 | 6/1990 | Japan | 280/728 |
| 0676912 | 8/1952 | United Kingdom | 220/640 |

*Primary Examiner*—Margaret A. Focarino
*Assistant Examiner*—Paul Dickson
*Attorney, Agent, or Firm*—Markell Seitzman

[57] ABSTRACT

A reaction can (40) formed from a light weight typically non-structural material, comprising: a housing (42) comprising sides (24a, b, 26a, b) defining an open mouth and a bottom (28) generally opposite the mouth; and a reinforcement collar the sides, about the mouth to reinforce the housing.

6 Claims, 4 Drawing Sheets

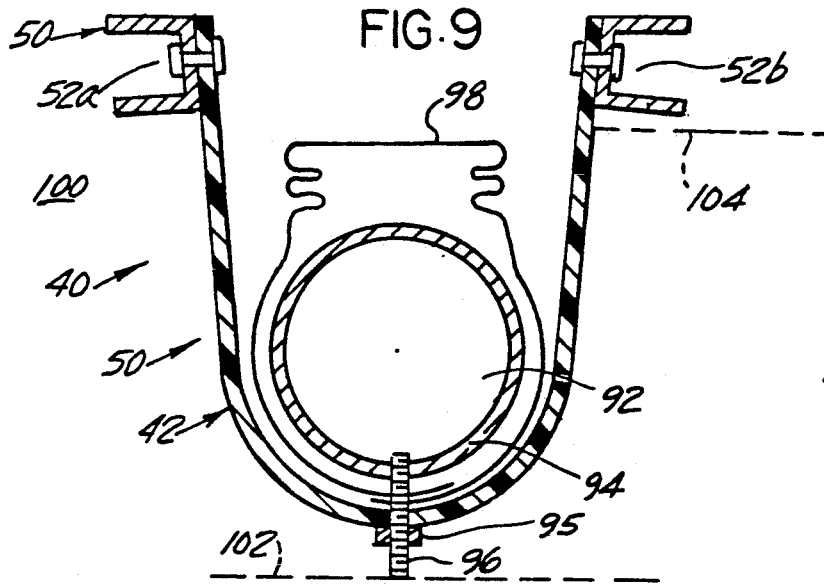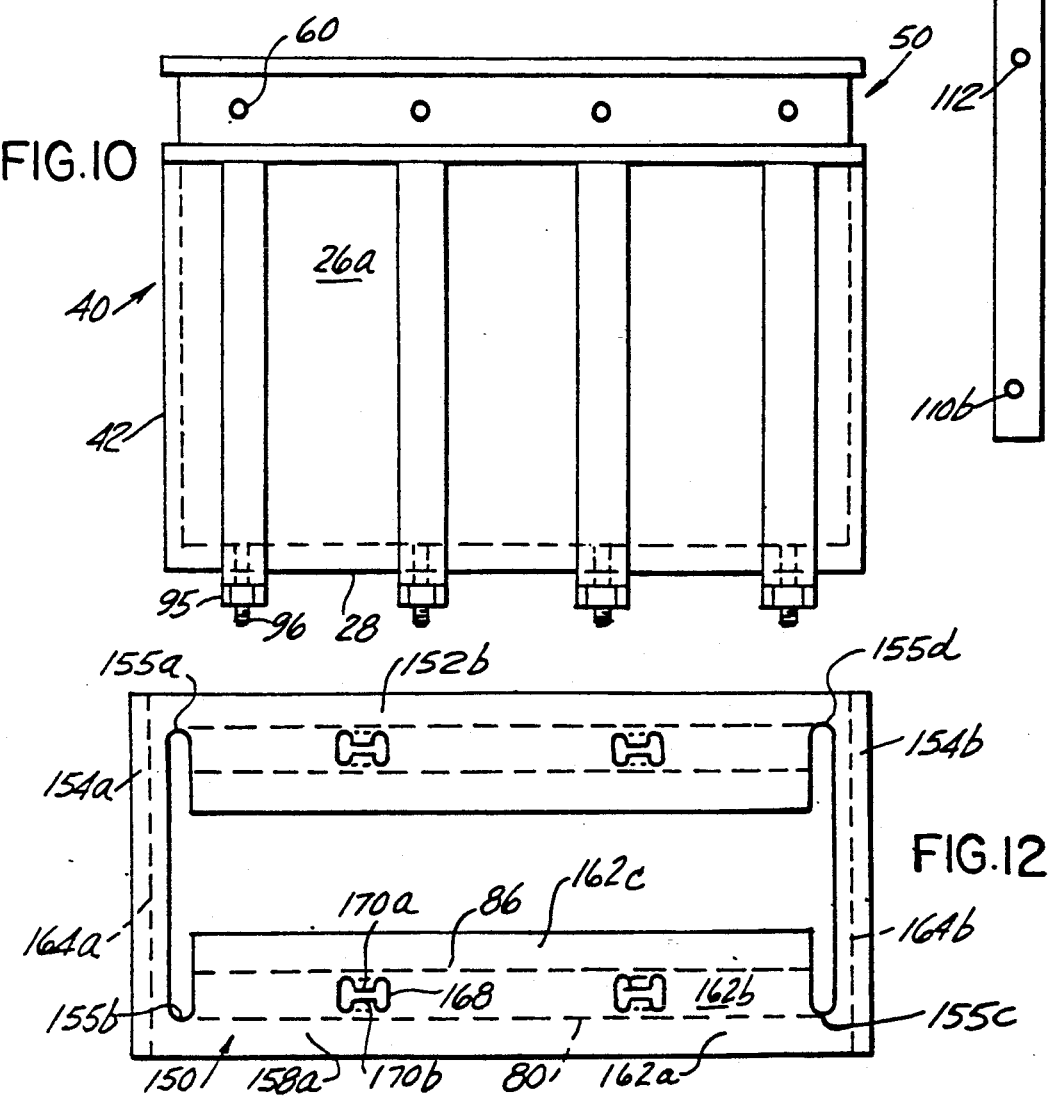

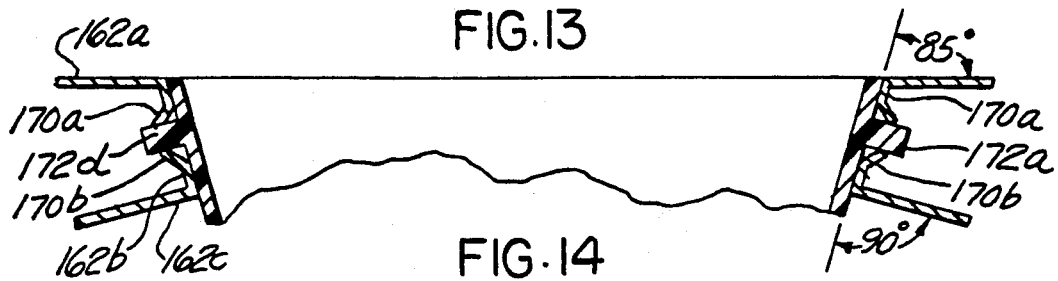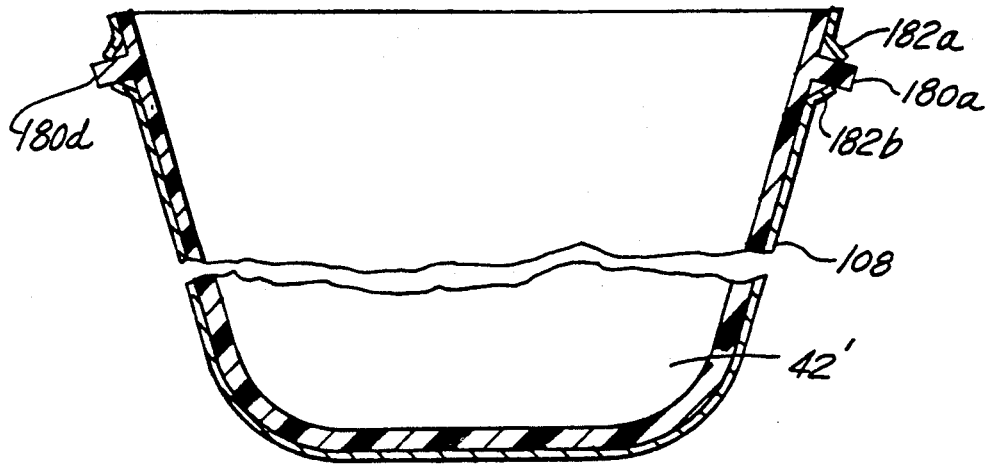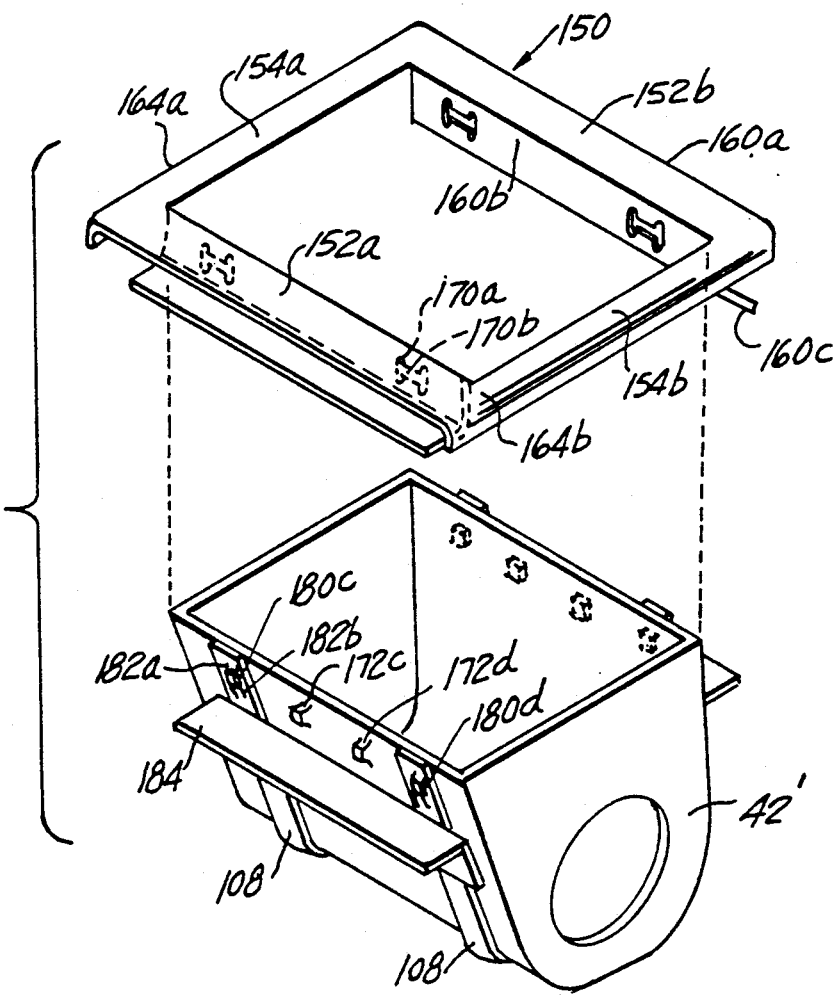

REACTION CAN FOR AIR BAG SYSTEM

BACKGROUND AND SUMMARY OF THE INVENTION

The present invention relates to an air bag inflation systems and more particularly to a housing or reaction can for a passenger side an air bag inflation system.

FIG. 1 is typical of a prior art reaction can, usually fabricated of metal, which is used to house and protect the other portions of the passenger side air bag system. Typically passenger side air bag systems include a cylindrically shaped gas generator about which may be placed an air bag in a folded configuration. Alternatively, a separate cylindrical sleeve or manifold is positioned about the gas generator with the air bag positioned about the manifold. The various parts are inserted into an open end 22 on one of the facing sides 24a, 24b of the reaction can 20. The other sides of the housing such as 26a and 26b may typically be formed of a single sheet of metal defining a bottom portion 28. Depending upon the mounting configuration the housing or reaction can 20 may include a plurality of openings such as 30a-30d to receive fasteners which exit from the manifold or gas generator or alternatively, other means may be formed in one or both of the sides 24a and 24b and used to support the gas generator manifold and air bag.

As previously mentioned, the prior art reaction can 20 is typically manufactured of metal as during inflation the air bag may tend to forcibly react with one or more of the sides 26a and 26b tending to warp same. The substantial construction of the metal retainer 20 lessens this warping and any incidental damage to a mating or closely spaced portion of the vehicle such as an instrument panel.

It is an object of the present invention to provide an improved, lightweight reaction can for an air bag inflation system. Accordingly, the invention comprises: a reaction can formed from a lightweight non-structural housing comprising sides defining an open mouth and collar secured to the sides about the mouth to reinforce the housing. In one embodiment of the invention the collar is formed of four separate pieces, while in other embodiments the collar is of unitary construction having an L or U shaped cross-section. In a further embodiment reinforcement straps extend for the collar and envelope the underside of the housing.

Many other objects and purposes of the invention will be clear from the following detailed description of the drawings.

BRIEF DESCRIPTION OF THE DRAWINGS

In the drawings:

FIG. 9 illustrates an assembly comprising the reaction can, gas generator and air bag.

FIGS. 10 and 11 illustrate an alternate embodiment of the present invention.

FIGS. 12 through 15 show other embodiments of the invention.

DETAILED DESCRIPTION OF THE DRAWINGS

Figure 2:
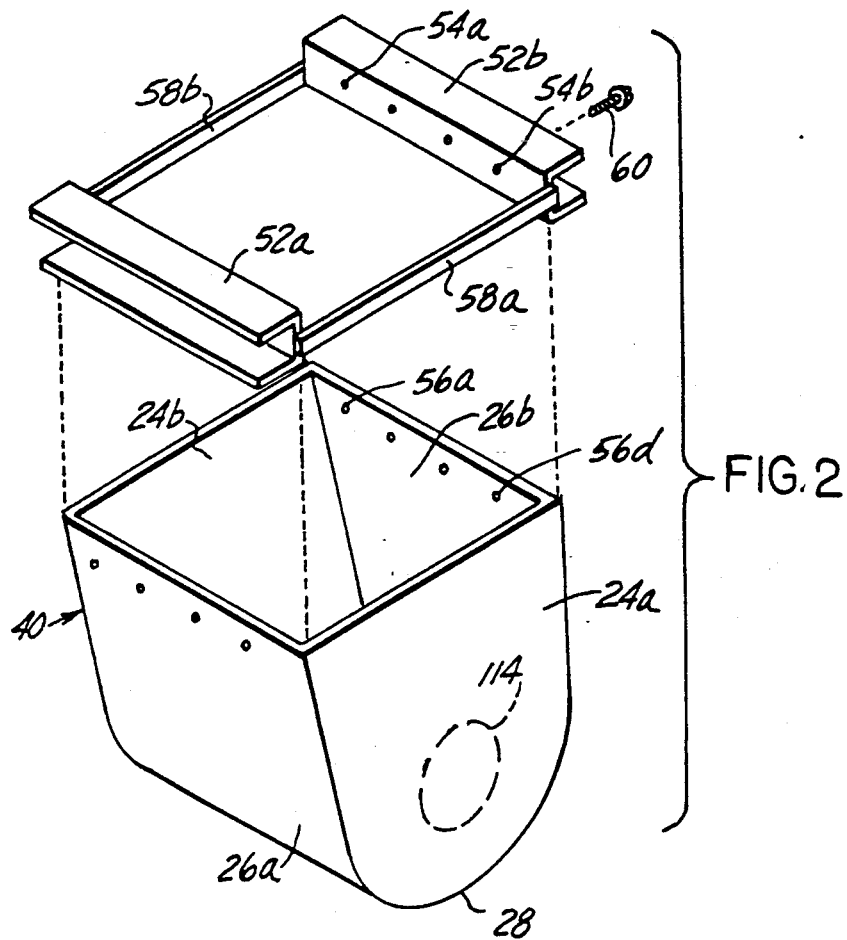
FIG. 2 illustrates a projected view of one embodiment of the present invention.
Figure 1:
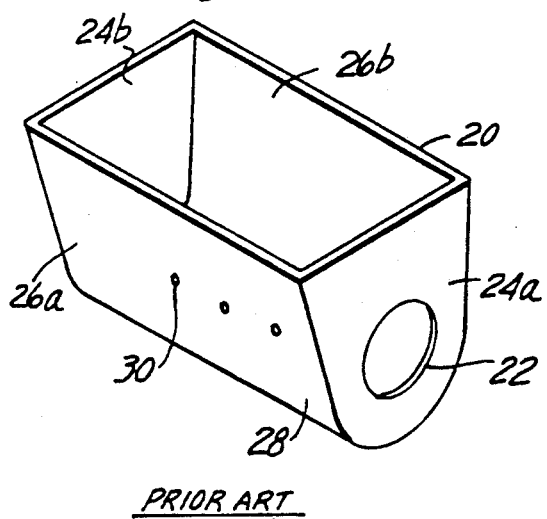
FIG. 1 illustrates a prior art reaction can for an air bag inflation system.

Reference is now made to FIG. 2 which illustrates a reaction can 40 constructed in accordance with the present invention. The reaction can 40 comprises a housing 42 having a general shape of the prior art reaction can 20 illustrated in FIG. 1. In the present invention the housing portion 42 of the reaction can 40 is fabricated typically of a nonstructural material such as polyethylene or polypropylene to reduce the weight of the entire assembly. Depending upon the application the housing can be somewhat rigid as in the sense to be self supporting or the housing can be extremely pliable. However, the use of plastic alone may prove insufficient in relation to the reaction forces generated on the reaction can 40 during the inflation of the air bag. To prevent the housing 42 from deforming during inflation, the present invention envisions utilizing a collar 50 positioned about the various sides 24a, b and 26a, b of the housing. In the embodiment illustrated in FIG. 2, the collar comprises two oppositely positioned reinforcement members 52a and 52b typically having a U-shaped cross-section to increase its strength. Each of these reinforcement members includes a plurality of openings such as 54a-54d. The longer sides such as 26a, 26b of the housing 42 similarly include matching openings 56a-56d. The reinforcement members 52a and 52b are spaced apart by lateral members 58a and 58b having the dimension of the narrower sides 24a and 24b. In this manner, the interior dimension of the collar, is substantially equal to the exterior dimension of the housing 42 proximate its opening. The collar is thereafter placed about the housing 42 and maintained in place by a corresponding number of fasteners, one of which is shown by numeral 60. Such fasteners can be nuts and bolts, rivets, self or interlocking tabs, etc. Alternatively, the collar can be insert molded about the housing.

Figure 3:
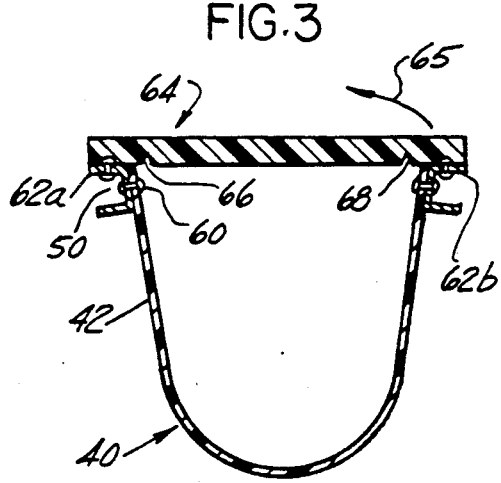
FIG. 3 illustrates a cross-sectional view of a retainer and also illustrates an air bag deployment door attached thereto.

Reference is now made to FIG. 3 which illustrates a cross-sectional view of the retainer 40 illustrated in FIG. 2. As can be seen, the collar 50 has been positioned about the housing 42 such that the top portions 62a and 62b are essentially collinear with the top of the housing 42. In this manner the top portions of the collar provide a means upon which an air bag deployment door such as 64 may be fastened. Typical of air bag deployment doors is that they are manufactured of plastic and include an integrally formed hinge 66 and a tear seam 68. During inflation of the air bag the inflating air bag urges the cover 64 outwardly thereby ripping apart the tear seam 68 and permitting the cover 64 to pivot (see arrow 65) outwardly relative to the hinge 66.

Figure 4:
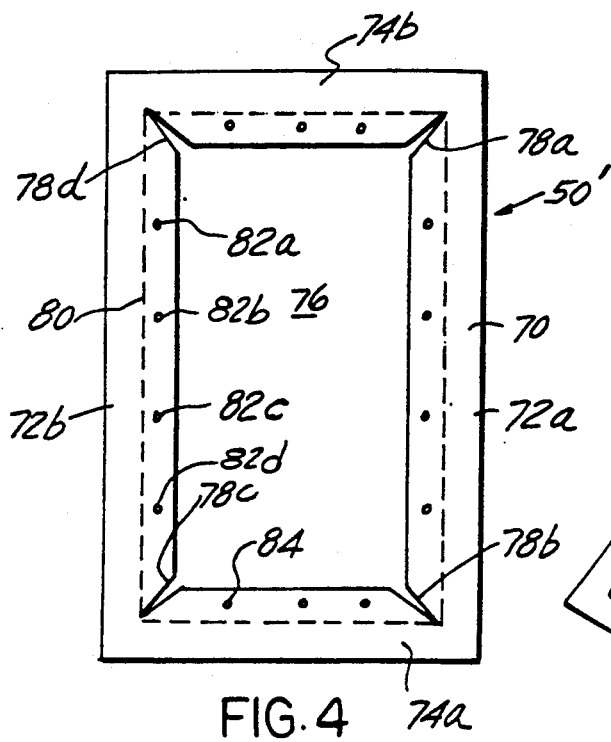
FIGS. 4 and 5 illustrate an alternate embodiment of the present invention.

As previously mentioned with regard to the description of FIG. 2, the collar 50 is formed by a plurality of individual pieces which are thereafter joined to provide for the proper spacing. FIG. 4 illustrates an alternate embodiment of the collar 50' in which the collar may be formed from one piece of bendable material such as aluminum or steel. As illustrated in FIG. 4, the preshaped form collar 50' resembles the shape of a picture frame, that is, it is an annular, rectangular, flat frame or structure 70 having parallel legs 72a, 72b, 74a, 74b, defining an opening 76. Positioned at a determinable distance from the outer edges of each of the legs 72a,b and 74a,b is a phantom line, the significance of which is discussed below. A portion of the frame 70 proximate the juncture of each of the legs is removed to provide a slot 78a–78d. The slot preferably extends only from the inner edge of each of these legs up through the phantom line 80. A plurality of openings 82a–82d is formed in each of the longer opposing legs 72a and b. Optionally additional openings 84 may also be formed in the legs 74a and 74b. The final form of the collar 50 is obtained by bending each of the legs about the fold line 80 (i.e., the above-mentioned phantom line), yielding the structure shown in FIG. 5. It should be appreciated that the distance between the fold lines 80 extending through each of the legs is chosen to equal the width and length of the sides of the housing 42 such that the collar 50' may be slid about the housing 42 and appropriate fasteners can be inserted within corresponding openings 82a–d and/or 84 to join the collar 50' to the housing 42. FIG. 6 illustrates a cross-sectional view of the assembled retainer 40 showing a portion of side 26a and a portion of the collar 50' where its L-shaped bent over configuration can be seen. It should be appreciated that the angle of the bent over portion(s) is chosen to achieve a good fit with the contours of the housing 42. The collar 50' and housing 42 are joined together by an appropriate fastener 60.

Figure 5:
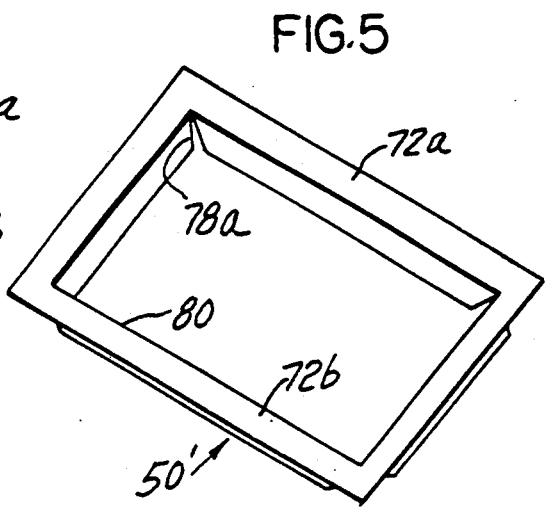
Figure 7:
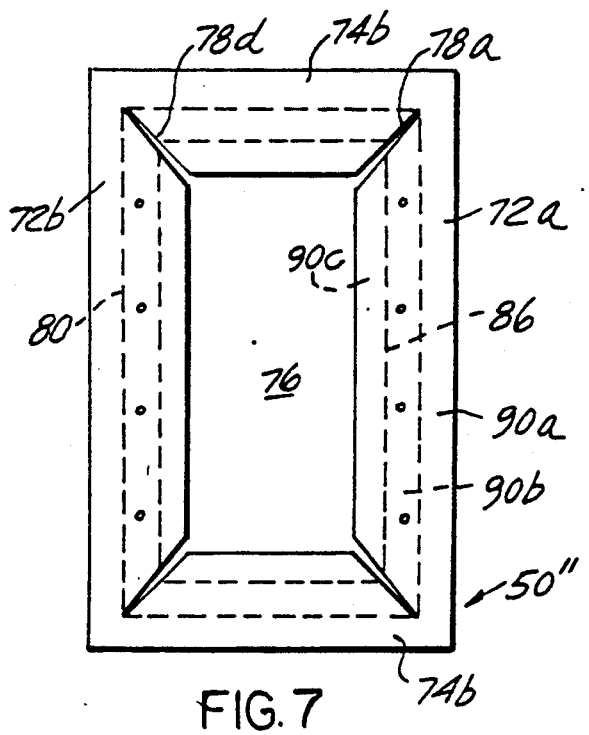
FIGS. 7 and 8 illustrate alternate embodiments of the present invention.
Figure 6:
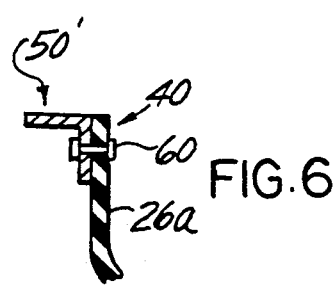
FIG. 6 illustrates a partial cross-sectional view of an assembled retainer.
Figure 8:
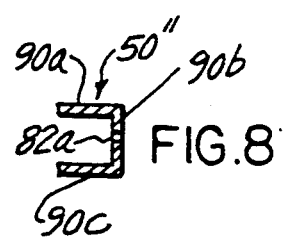

If for performance reasons it is desired to provide a collar which includes the U-shaped cross-sectional features and enhanced structural characteristics similar to the collar 50 shown in FIG. 2, such a collar can be constructed employing the methodology of the alternate embodiment illustrated in FIGS. 4 and 5. As before, the collar 50" is constructed of a flat plate in the form of a picture frame having long sides 72a, 72b, and narrow sides 74a, 74b defining an opening 76 therein. As can be noted, each of the sides is wider than the corresponding sides of the collar 50' shown in FIG. 4 to accommodate the desired U-shaped cross-section. Superimposed upon the plate is fold line 80 the dimensions of which are chosen in accordance with those used in the embodiment of FIG. 4. The collar 50' additionally includes in its pre-formed state, an additional fold line 86 spaced from the inner edge of each of the various legs and the first fold line 80. Proximate the intersection of each of the legs is a partial slit 78a–78d which partially separates each of the sides 72a, 72a, 74a, 75b. Each of the sides is first folded about the first fold line 86 thereafter the folded sides are once again folded about the first fold line 80. The resulting structure is illustrated in FIG. 8 wherein the collar 50" has the desired U-shaped cross-section with the outer portion such as 90a of each side forming the top of the collar, the middle portion such as 90b forming the middle portion of the collar, i.e., the portion of the collar which will lie adjacent to the sides of the housing 42 and the inner portion 90c of each side forming the lower portion of the collar 50". As can be seen from FIG. 8, the middle portion 90b of the collar may also include one of the mounting openings such as 82a.

Reference is now made to FIG. 9 which illustrates the reaction can 40, its housing 42, and one of the collars such as 50. In addition FIG. 9 diagrammatically illustrates other portions of a passenger air bag system which may include a cylindrically shaped gas generator 92, a retainer 94 typically formed as a rectangular cylindrical sleeve to protect and support the inflator 92 and one of a plurality of fasteners 96 which extend through the retainer 92 and lock or mount the gas generator to the reaction can. Also shown is an air bag 98 in its folded configuration. The assembly illustrated in FIG. 9 would typically include the air bag deployment door 64 shown in FIG. 3, however, the door has been left out of FIG. 9. The passenger side air bag assembly 100 comprising the above-described parts must thereafter be secured to or near the instrument panel of a vehicle. As can be appreciated, the assembly illustrated in FIG. 9 offers the designer some options as to how the assembly 100 may be mounted in the vehicle. As an example, the retainer 94 by virtue of its fastening bolts 96 may mounted directly to a portion of the vehicle understructure 102 below the instrument panel. In this manner, upon inflation of the air bag reaction forces are transmitted directly to this understructure thereby lessening the forces which must be absorbed by the reaction can 40. Alternatively, the collar 50 provides a means by which the retainer 40 may be connected to another structural portion 104 of the vehicle proximate the vehicle instrument panel. In this type of mounting relationship the reaction forces resulting from the inflation of the air bag would totally be absorbed by the housing 42 as the retainer 94 is directly fastened to the housing. As previously mentioned, it is envisioned that the housing 42 may be manufactured of a lightweight, nonstructural material. If this alternate mounting relationship is chosen, it may be preferable to reinforce the housing 42.

Reference is made to FIG. 10 which illustrates another embodiment of the present invention. FIG. 10 illustrates a reaction can 40 and its housing 42 and collar 50. Extending from the housing 42 are the plurality of bolts 96 which may typically extend from the retainer 94. Circumferentially extending about the sides 26a and 26b as well as the bottom 28 of the housing 42, are a plurality of, preferably at least two, flat metal bands 108. Each of the bands as more specifically illustrated in FIG. 11 comprise mounting holes 110a and 110b proximate its ends which would be mounted to the housing. Each band 108 further includes and additional mounting hole 112 positioned at the midpoint of the band 108. Each band 108 is mounted to the housing 42 such that one of the fasteners 60 which is used to mount the collar 50 to the housing 42 extends through a corresponding one of the end openings or holes 110a and/or 110b and the retainer bolt 96 extends through the middle opening 112 and secured by the nut 95. Alternatively, the bands can be spot welded to the collar 50. In this case the holes 110a and 110b would be eliminated. It should be appreciated that if the bolts 96 are not used the middle opening can also be eliminated.

It is often desirable to postpone placing the gas inflator into the retainer until the last moment in the assembly process. As such, and as proposed in the art, the retainer 94 with the air bag 98 secured thereabout may first be placed within the housing 42. At a later time the gas generator may thereafter be inserted into the retainer. Typically, this will require the housing 42 to be fabricated with an optional opening 114 in one of its sides such as 24a such that the gas generator may be axially slid within the hole 114, placed within the retainer 94 and then secured by the fasteners 96.

Reference is made to FIG. 12 which shows still another embodiment of the present invention. There is illustrated another version of the collar shown as 150 in its preformed state. As can be seen, the collar 150 is formed from a flat plate of metal having two wider lateral sides 152a and 152b and two thinner sides 154a and 154b. A plurality of slits or slots 155a–d are provided to set off the sides 152a and b from the sides 154a and b. A first fold line 80 and a second fold line 86 are defined in each side 152a, 152b. The plate of FIG. 12 is folded about each of the fold lines 80 and 86 to achieve the general U-shaped section 160 of each of the sides 152a and 152b (see FIG. 13). As can be seen, the top 162a, side 162b and bottom 162c of each of the formed sides need not be perpendicular to one another, thereby accommodating a conically or other shaped housing 42'. In one embodiment the sides 154a and 154b of the collar 150 are not bent and extend axially outward or alternatively may be bent about the fold lines 164a and 164b approximately 90 degrees to provide a narrow lip, the result of which is to strengthen the collar 150.

A comparision of collar 150 with collar 50 will reveal that the mounting holes 54a–d have been eliminated and replaced by a plurality of integrally formed holes 168 and tabs such as 170a and 170b. As can be seen from FIG. 12, four such tabs are utilized. To accommodate these sets of tabs 170a and 170b the housing 42' is formed with a corresponding number of outwardly extending bosses 172a–172d. Only bosses 172a and 172d are illustrated in FIG. 13. Upon assembly the housing 42' is inserted in the collar 150 and the various bosses 172a–172d fitted to the corresponding sets of tabs 170a, 170b to provide a snap fit therebetween as the tabs will bite into the preferrably plastic bosses.

The use of the tabs 170 and bosses 174 provide one method of attaching the various mating parts. As an example the bands 108 can be formed to the shape of the housing 42' and spot welded to the side 162b of the collar 150. As can be appreciated the collar and bands form a cradle into which the housing 42' is placed.

FIGS. 14 and 15 illustrate still another embodiment of the invention in which the housing 42' is fabricated with another plurality of extending bosses 180a–d and wherein each of the bands proximate its ends are formed with a plurality of facing tabs 182a and 182b similar to tabs 170a and 170b. In this embodiment of the invention each of the bands 108 is secured directly to the housing 42' via the snap-fit engagement between the tabs 182 and bosses 180. As before, the collar 150 is snap-fit to the bosses 172. FIG. 15 additionally shows the use of an added bracket 184 attached directly across each of the bands 108 across both sides 26a and 26b of the housing 42'. These brackets 184 provide another mounting option whereby the reaction can 40 is mounted to a cooperating structure within the vehicle. Upon inflation of the air bag any reaction forces imparted to the housing 42' are absorbed by the bands 108 and brackets 184 as such the housing 42' or at least the lower portion thereof can be made of extremely thin material.

Many changes and modifications in the above described embodiment of the invention can, of course, be carried out without departing from the scope thereof. Accordingly, that scope is intended to be limited only by the scope of the appended claims.

We claim:
1. A two-piece reaction can (40) comprising:
the first piece comprising: a housing (42) formed from a light weight pliable material, comprising sides (24a, b, 26a, b) defining an open mouth and a bottom (28) generally opposite the mouth;
the second piece comprising: reinforcement means (50; 50'; 50", 108) secured to and surrounding all of the sides, and positioned proximate the mouth to reinforce the housing including a reinforcement collar (50) positioned about the mouth and secured thereto and reinforcement straps (108) extending from one side of the collar across the bottom to another side of the collar, wherein the collar includes two L-shaped pieces positioned against two opposing sides and wherein the collar further includes two flat pieces joining the L-shaped pieces and positioned against other sides of the housing.

2. A two-piece reaction can (40) comprising:
the first piece comprising: a housing (42) formed from a light weight pliable material, comprising sides (24a, b 26a, b) defining an open mouth and a bottom (28) generally opposite the mouth;
the second piece comprising: reinforcement means (50; 50'; 50", 108) secured to and surrounding all of the sides, and positioned proximate the mouth to reinforce the housing, wherein the reinforcement means includes a collar positioned about the mouth, wherein the collar is formed from an annular, rectangular flat frame having four legs (72a, b; 74a, b), including partial slits at each interior corner thereof partially separating each of the frame, each leg includes a first bent over portion forming a L-shaped cross-section, the distance between opposite bent over leg portions being approximately equal to the distance between designated sides of the housing.

3. The apparatus as defined in claim 2 wherein opposite bent over leg portions further include a second bent over portion yielding a leg portion having a U-shaped cross-section.

4. The apparatus as defined in claim 2 wherein an air bag deployment door is secured to the collar.

5. A two-piece reaction can (40) comprising:
the first piece comprising; a housing (42) formed from a light weight pliable material, comprising sides (24a, b, 26a, b) defining an open mouth and a bottom (28) generally opposite the mouth;
the second piece comprising; reinforcement means (50; 50'; 50", 108) secured to and surrounding all of the sides, and positioned proximate the mouth to reinforce the housing, wherein the reinforcement means (50; 50'; 50", 108) includes a reinforcement collar (50) positioned about the mouth and secured thereto and reinforcement straps (108) mounted to sides of the housing extending from one side of the housing across the bottom to another side of the housing, wherein the sides include at least one boss extending therefrom and wherein each reinforcement strap includes means connectable with the boss for permitting the reinforcement strap to be mounted thereon.

6. The apparatus as defined in claim 5 including a bracket secured to the straps.

* * * * *